United States Patent
Kiczenski et al.

(10) Patent No.: US 10,112,865 B2
(45) Date of Patent: *Oct. 30, 2018

(54) INTERMEDIATE TO HIGH CTE GLASSES AND GLASS ARTICLES COMPRISING THE SAME

(71) Applicant: Corning Incorporated, Corning, NY (US)

(72) Inventors: Timothy James Kiczenski, Corning, NY (US); John Christopher Mauro, Corning, NY (US); Michelle Diane Pierson-Stull, Painted Post, NY (US); Robert Anthony Schaut, Painted Post, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,189

(22) Filed: Apr. 22, 2016

(65) Prior Publication Data

US 2016/0236972 A1    Aug. 18, 2016

Related U.S. Application Data

(63) Continuation of application No. 14/458,565, filed on Aug. 13, 2014, now Pat. No. 9,346,705.

(60) Provisional application No. 61/878,829, filed on Sep. 17, 2013, provisional application No. 61/866,168, filed on Aug. 15, 2013.

(51) Int. Cl.
| | |
|---|---|
| C03C 3/091 | (2006.01) |
| C03C 13/04 | (2006.01) |
| C03C 3/085 | (2006.01) |
| C03C 3/087 | (2006.01) |
| B32B 17/00 | (2006.01) |
| C03B 17/02 | (2006.01) |
| B32B 17/06 | (2006.01) |

(52) U.S. Cl.
CPC ............ *C03C 13/046* (2013.01); *B32B 17/00* (2013.01); *B32B 17/06* (2013.01); *C03B 17/02* (2013.01); *C03C 3/085* (2013.01); *C03C 3/087* (2013.01); *C03C 3/091* (2013.01); *B32B 2457/20* (2013.01); *Y02P 40/57* (2015.11)

(58) Field of Classification Search
CPC ......... C03C 3/085; C03C 3/087; C03C 3/091; B32B 17/00
See application file for complete search history.

(56) References Cited

U.S. PATENT DOCUMENTS

| | | | |
|---|---|---|---|
| 5,559,060 A | 9/1996 | Dumbaugh, Jr. et al. | |
| 5,785,726 A | 7/1998 | Dorfeld et al. | |
| 5,824,127 A | 10/1998 | Bange et al. | |
| 6,128,924 A | 10/2000 | Bange et al. | |
| 7,201,965 B2 | 4/2007 | Gulati et al. | |
| 7,696,113 B2 | 4/2010 | Ellison | |
| 8,007,913 B2 | 8/2011 | Coppola et al. | |
| 8,349,751 B2 | 1/2013 | Nagai et al. | |
| 9,346,705 B2 * | 5/2016 | Kiczenski | B32B 17/00 |
| 9,512,030 B2 * | 12/2016 | Mauro | C03C 3/089 |
| 2006/0242996 A1 | 11/2006 | DeAngelis et al. | |
| 2008/0206494 A1 | 8/2008 | Kurachi et al. | |
| 2010/0084016 A1 | 4/2010 | Aitken et al. | |
| 2010/0300536 A1 | 12/2010 | Aitken et al. | |
| 2014/0335331 A1 | 11/2014 | Ellison et al. | |
| 2015/0037552 A1 | 2/2015 | Mauro | |
| 2015/0037553 A1 | 2/2015 | Mauro | |
| 2015/0051060 A1 | 2/2015 | Ellison et al. | |

FOREIGN PATENT DOCUMENTS

| | | |
|---|---|---|
| CN | 102417295 A | 4/2012 |
| JP | 2003054984 | 2/2003 |
| JP | 2004002062 | 1/2004 |
| JP | 2005089286 A | 4/2005 |
| JP | 2005263628 A | 9/2005 |
| JP | 2006188406 | 7/2006 |
| JP | 2007246365 | 9/2007 |
| JP | 2011093728 A | 5/2011 |
| JP | 2011162413 A | 8/2011 |
| JP | 2013530123 A | 7/2013 |
| WO | 2013065648 A1 | 5/2013 |

OTHER PUBLICATIONS

English Translation of CN201480054310.X First Office Action dated Mar. 17, 2017, China Patent Office.
International Search Report and Written Opinion of the International Searching Authority; PCT/US2014/050486; dated Mar. 6, 2015.
International Preliminary Report on Patentability; PCT/US2014/050486; dated Feb. 23, 2016.
English Translation of JP2016534765 Office Action dated May 8, 2018; 4 pages; Japanese Patent Office.

* cited by examiner

*Primary Examiner* — Elizabeth A. Bolden

(57) ABSTRACT

Intermediate to high CTE glass compositions and laminates formed from the same are described. The glasses described herein have properties, such as liquidus viscosity or liquidus temperature, which make them particularly well suited for use in fusion forming processes, such as the fusion down draw process and/or the fusion lamination process. Further, the glass composition may be used in a laminated glass article, such as a laminated glass article formed by a fusion laminate process, to provide strengthened laminates via clad compression as a result of CTE mismatch between the core glass and clad glass.

13 Claims, 1 Drawing Sheet

INTERMEDIATE TO HIGH CTE GLASSES AND GLASS ARTICLES COMPRISING THE SAME

RELATED APPLICATIONS

This application is a continuation of U.S. application Ser. No. 14/458,565 filed Aug. 13, 2014 which claims the benefit of priority under 35 U.S.C. § 119 of U.S. Provisional Application Ser. No. 61/878,829 filed on Sep. 17, 2013 and U.S. Provisional Application Ser. No. 61/866,168 filed on Aug. 15, 2013 the content of which is relied upon and incorporated herein by reference in its entirety.

BACKGROUND

Field

The present specification generally relates to glass compositions and, more specifically, to intermediate to high CTE, potassium-containing aluminosilicate and/or aluminoborosilicate glass compositions and glass articles comprising the same.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Glass articles are commonly strengthened by thermal tempering and/or by ion exchange treatment. In either case, the glass article is subjected to additional processing steps after the glass article is formed. These additional processing steps may increase the overall cost of the glass article. Moreover, the additional handling required to carry out these processing steps increases the risk of damage to the glass article which decreases manufacturing yields and further increases production costs and the ultimate cost of the glass article.

Accordingly, a need exists for alternative glass compositions which may be used to produce strengthened glass articles without the need for additional processing steps and glass articles manufactured from such compositions.

SUMMARY

A first aspect comprises a glass composition comprising about 60 mol % to about 75 mol % $SiO_2$, about 2 mol % to about 11 mol % $Al_2O_3$, 0 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A second aspect comprises a glass composition comprising about 65 mol % to about 75 mol % $SiO_2$, about 5 mol % to about 11 mol % $Al_2O_3$, about 4 mol % to about 11 mol % $B_2O_3$, 0 mol % to about 0.5 mol % $Na_2O$, about 2 mol % to about 13 mol % $K_2O$, 0 mol % to about 7 mol % MgO, 0 mol % to about 9 mol % CaO, about 2 mol % to about 6 mol % SrO, 0 mol % to about 1 mol % BaO, and about 3 mol % to about 16 mol % R'O, wherein R'O comprises the mol % of MgO, CaO, SrO, and BaO in the composition.

Another aspect comprises a glass composition comprising about 60 mol % to about 75 mol % $SiO_2$, about 5 mol % to less than 8 (<8) mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A fourth aspect comprises a glass composition comprising about 60 mol % to about 75 mol % $SiO_2$, about 2 mol % to about 11 mol % $Al_2O_3$, about 4 mol % to less than 7 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A fifth aspect comprises a glass composition comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, greater than 8 mol % to about 14 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A sixth aspect comprises a glass composition comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about less than 9 mol % R'O, wherein R'O comprises the mol % of MgO, CaO, SrO, and BaO in the composition.

In some embodiments, the glass compositions above further comprise one or more of $SnO_2$, $Fe_2O_3$, or $ZrO_2$, wherein when present, the amount of each of $SnO_2$, $Fe_2O_3$, or $ZrO_2$ is from greater than 0 to about 3 mol %.

In some embodiments, the glass composition above consist essentially of the components listed above along with >0 mol % to about 3 mol % of one or more of $SnO_2$, $Fe_2O_3$, or $ZrO_2$, and from 0 to about 3 mol % of one or more of $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $CeO_2$, $Fe_2O_3$, $F^-$, $Cl^-$, $Br^-$, or $I^-$.

In some embodiments, the glass compositions above have a CTE from about $55 \times 10^{-7}/°$ C. to about $120 \times 10^{-7}/°$ C. in a range from 20° C. to 300° C. In other embodiments, the glass compositions above have a from about $75 \times 10^{-7}/°$ C. to about $110 \times 10^{-7}/°$ C. in a range from 20° C. to 300° C. In some embodiments, the glass compositions above have a liquidus viscosity is greater than or equal to about 100 kPoise. In other embodiments, the glass compositions above have a liquidus viscosity is greater than or equal to about 250 kPoise.

Also embodied herein are glass laminates comprising a core glass and at least one clad glass. A seventh aspect comprises a glass laminate comprising a glass core and at least one glass clad, wherein the glass core comprises comprising about 60 mol % to about 75 mol % $SiO_2$, about 2 mol % to about 11 mol % $Al_2O_3$, 0 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

And eighth aspect comprises a glass laminate comprising a glass core comprising about 65 mol % to about 75 mol % $SiO_2$, about 5 mol % to about 11 mol % $Al_2O_3$, about 4 mol % to about 11 mol % $B_2O_3$, 0 mol % to about 0.5 mol % $Na_2O$, about 2 mol % to about 13 mol % $K_2O$, 0 mol % to about 7 mol % MgO, 0 mol % to about 9 mol % CaO, about 2 mol % to about 6 mol % SrO, 0 mol % to about 1 mol % BaO, and about 3 mol % to about 16 mol % R'O, wherein R'O comprises the mol % of MgO, CaO, SrO, and BaO in the composition.

A ninth aspect comprises a glass laminate comprising a glass core comprising about 65 mol % to about 73 mol % $SiO_2$, about 5 mol % to about 11 mol % $Al_2O_3$, about 4 mol % to about 11 mol % $B_2O_3$, >0 mol % to about 0.5 mol % $Na_2O$, about 2 mol % to about 13 mol % $K_2O$, 0 mol % to about 7 mol % MgO, >0 mol % to about 9 mol % CaO, about 2 mol % to about 6 mol % SrO, >0 mol % to about 1 mol % BaO, and about 5 mol % to about 16 mol % R'O, wherein R'O comprises the mol % of MgO, CaO, SrO, and BaO in the composition.

A tenth aspect comprises a glass laminate comprising about 60 mol % to about 75 mol % $SiO_2$, about 5 mol % to less than 8 (<8) mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

An eleventh aspect comprises a glass laminate comprising about 60 mol % to about 75 mol % $SiO_2$, about 2 mol % to about 11 mol % $Al_2O_3$, about 4 mol % to less than 7 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

A twelfth aspect comprises a glass laminate comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, greater than 8 mol % to about 14 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about 16 mol % R'O, wherein R'O comprises the mol % of MgO, CaO, SrO, and BaO in the composition.

Another aspect comprises a glass laminate comprising about 60 mol % to about 75 mol % $SiO_2$, about 2 mol % to about 11 mol % $Al_2O_3$, about 4 mol % to about 11 mol % $B_2O_3$, 0 mol % to about 1 mol % $Na_2O$, about 1 mol % to about 18 mol % $K_2O$, 0 mol % to about 7 mol % MgO, 0 mol % to about 9 mol % CaO, about 1 mol % to about 8 mol % SrO, 0 mol % to about 4 mol % BaO, and about 3 mol % to about less than 9 mol % R'O, wherein R'O comprises the mol % of MgO, CaO, SrO, and BaO in the composition.

In some embodiments, the glass core of any of the glass laminates above further comprises one or more of $SnO_2$, $Fe_2O_3$, or $ZrO_2$, wherein when present, the amount of each of $SnO_2$, $Fe_2O_3$, or $ZrO_2$ is from greater than 0 to about 3 mol %.

In some embodiments, the glass composition above consist essentially of the components listed above along with >0 mol % to about 3 mol % of one or more of $SnO_2$, $Fe_2O_3$, or $ZrO_2$, and from 0 to about 3 mol % of one or more of $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $CeO_2$, $Fe_2O_3$, $F^-$, $Cl^-$, $Br^-$, or $I^-$.

In some embodiments, the glass core above has a CTE from about $55\times10^{-7}/°$ C. to about $120\times10^{-7}/°$ C. in a range from 20° C. to 300° C. In other embodiments, the glass cores described above have a from about $75\times10^{-7}/°$ C. to about $110\times10^{-7}/°$ C. in a range from 20° C. to 300° C. In some embodiments, the glass cores described above have a liquidus viscosity is greater than or equal to about 100 kPoise. In other embodiments, the glass cores described above have a liquidus viscosity is greater than or equal to about 250 kPoise.

In some embodiments, the glass laminates described above comprise a clad glass comprising about 60 mol % to about 66 mol % $SiO_2$, about 7 mol % to about 10 mol % $Al_2O_3$, about 14 mol % to about 18 mol % $B_2O_3$, and about 9 mol % to about 16 mol % alkaline earth oxide, wherein the alkaline earth oxide comprises at least CaO and the CaO is present in the glass composition in a concentration from about 3 mol % to about 12 mol %, and wherein the glass composition is substantially free from alkali metals and compounds containing alkali metals.

A fourteenth aspect comprises a use of any of the above glass compositions or laminates in a cover glass or glass backplane application in consumer or commercial electronic devices, including LCD and LED displays, computer monitors, automated teller machines (ATMs), for touch screen or touch sensor applications, for portable electronic devices including mobile telephones, personal media players, and tablet computers, for photovoltaic applications, for architectural glass applications, for automotive or vehicular glass applications, or for commercial or household appliance applications.

Additional features and advantages of the glass compositions and glass articles formed from the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
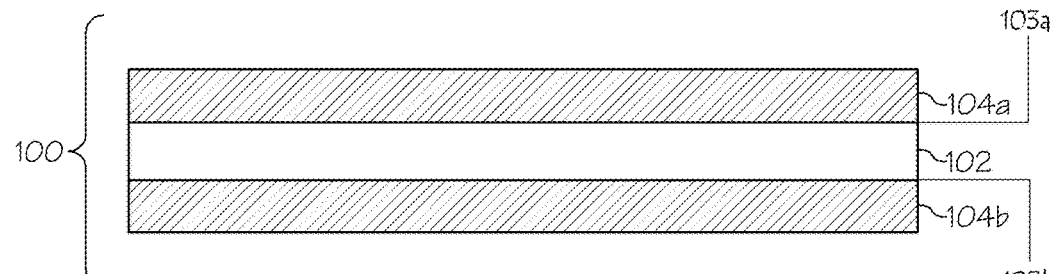
FIG. 1 schematically depicts a cross section of a laminated glass article according to one or more embodiments shown and described herein.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

The term "substantially free," when used to describe the absence of a particular oxide constituent in a glass composition, means that the constituent is present in the glass composition as a contaminant in a trace amount of less than 1 mol %.

In the embodiments of the glass compositions described herein, the concentration of constituent components (e.g., $SiO_2$, $Al_2O_3$, $B_2O_3$ and the like) are given in mole percent (mol %) on an oxide basis, unless otherwise specified.

The term "liquidus viscosity, as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

Intermediate to High CTE Glasses

The glass compositions described herein have properties, such as the liquidus viscosity and the liquidus temperature, which make the glass compositions particularly well suited for use in fusion forming processes, such as the fusion down draw process and/or the fusion lamination process. These properties are attributable to the specific compositions of the glasses, as will be described in more detail herein.

A first aspect comprises a glass composition having an intermediate to high CTE and comprising (Composition 1):
about 60 mol % to about 75 mol % $SiO_2$
about 2 mol % to about 11 mol % $Al_2O_3$
0 mol % to about 11 mol % $B_2O_3$
0 mol % to about 1 mol % $Na_2O$
about 1 mol % to about 18 mol % $K_2O$
0 mol % to about 7 mol % MgO
0 mol % to about 9 mol % CaO
about 1 mol % to about 8 mol % SrO,
0 mol % to about 4 mol % BaO, and
about 3 mol % to about 16 mol % R'O, wherein R'O comprises the mol % of MgO, CaO, SrO, and BaO in the composition.

In another aspect, the glass may comprise a composition comprising (Composition 2):
about 65 mol % to about 75 mol % $SiO_2$
about 5 mol % to about 11 mol % $Al_2O_3$
about 4 mol % to about 11 mol % $B_2O_3$
0 mol % to about 0.5 mol % $Na_2O$
about 2 mol % to about 13 mol % $K_2O$
0 mol % to about 7 mol % MgO
0 mol % to about 9 mol % CaO
about 2 mol % to about 6 mol % SrO,
0 mol % to about 1 mol % BaO,
about 3 mol % to about 16 mol % R'O,
wherein R'O comprises the mol % of MgO, CaO, SrO, and BaO in the composition.

In another aspect, the glass composition comprises (Composition 3):
about 60 mol % to about 75 mol % $SiO_2$,
about 5 mol % to less than 8 mol % $Al_2O_3$,
about 4 mol % to about 11 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A fourth aspect comprises a glass composition comprising (Composition 4):
about 60 mol % to about 75 mol % $SiO_2$,
about 2 mol % to about 11 mol % $Al_2O_3$,
about 4 mol % to less than 7 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A fifth aspect comprises a glass composition comprising (Composition 5):
about 60 mol % to about 75 mol % $SiO_2$,
about 2 mol % to about 11 mol % $Al_2O_3$,
about 4 mol % to about 11 mol % $B_2O_3$,
0 mol % to about 1 mol % $Na_2O$,
greater than 8 mol % to about 14 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

A sixth aspect comprises a glass composition comprising (Composition 6):
about 60 mol % to about 75 mol % $SiO_2$,
about 2 mol % to about 11 mol % $Al_2O_3$,
about 4 mol % to about 11 mol % $B_2O_3$,
0 mol % to about 1 mol % $Na_2O$,
about 1 mol % to about 18 mol % $K_2O$,
0 mol % to about 7 mol % MgO,
0 mol % to about 9 mol % CaO,
about 1 mol % to about 8 mol % SrO,
0 mol % to about 4 mol % BaO, and
about 3 mol % to about less than 9 mol % R'O,
wherein R'O comprises the mol % of MgO, CaO, SrO, and BaO in the composition.

As detailed herein the glass compositions may further comprise 0 to about 3 mol %, or in some cases >0 to about 1 mol %, additional components and fining agents, such as $SnO_2$, $Fe_2O_3$, $ZrO_2$. In addition, the glass composition may include from about 1 mol % to about 28 mol % alkaline earth oxide. The alkaline earth oxide may include at least one of CaO, SrO, MgO, and BaO.

In the embodiments of the glass compositions described herein $SiO_2$ is the largest constituent of the composition and, as such, $SiO_2$ is the primary constituent of the resulting glass network. $SiO_2$ is utilized in the glass compositions described herein to obtain the desired liquidus viscosity while, at the same time, offsetting the amount of $Al_2O_3$ added to the composition. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount from about 60 to about 75 mol %. In other embodiments, the glass composition generally comprises about 65 to about 75 mol % $SiO_2$. For example, in some embodiments, the amount of $SiO_2$ in the glass composition is about 60 to about 75 mol %, about 60 to about 73 mol %, about 60 to about 70 mol %, about 60 to about 67 mol %, about 60 to about 65 mol %, about 60 to about 63 mol %, about 63 to about 75 mol %, about 63 to about 73 mol %, about 63 to about 70 mol %, about 63 to about 67 mol %, about 63 to about 65 mol %, about 65 to about 75 mol %, about 65 to about 73 mol %, about 65 to about 70 mol %, about 65 to about 67 mol %, about 65 to about 75 mol %, about 67 to about 73 mol %, about 67 to about 70 mol %, about 70 to about 75 mol %, about 70 to about 73 mol %, or about 73 to about 75 mol % $SiO_2$. In some embodiments, the glass composition comprises about 60, 61, 62, 63, 64, 65, 66, 67, 68, 69, 70, 71, 72, 73, 74, or 75 $SiO_2$.

In some embodiments, the glass compositions may further comprise $Al_2O_3$. $Al_2O_3$, when present, may act in a manner similar to $SiO_2$ and may increase the viscosity of the glass composition when in a tetrahedral coordination in a glass melt formed from the glass composition. However, the presence of $Al_2O_3$ in the glass compositions may also increases the mobility of alkali constituents in the glass components. Accordingly, the amount of $Al_2O_3$ in the glass compositions needs to be carefully considered.

In the embodiments of the glass compositions described herein, the concentration of $Al_2O_3$ in the glass compositions, when present, is generally from about 2 to about 11 mol %. In some embodiments, $Al_2O_3$ is present in the glass compositions at from about 5 to <8 mol %. In some embodiments, the glass composition can comprise from about 2 to about 11 mol %, about 2 to about 10 mol %, about 2 to about 8 mol %, about 2 to <8 mol %, about 2 to about 5 mol %, about 4 to about 11 mol %, about 4 to about 10 mol %, about 4 to about 8 mol %, about 4 to <8 mol %, about 5 to about 11 mol %, about 5 to about 10 mol %, about 5 to about 8 mol %, about 5 to <8 mol %, about 8 to about 11 mol %, or about 8 to about 10 mol % $Al_2O_3$. In some embodiments, the glass or glass ceramic composition can comprise about 2, 3, 4, 5, 6, 7, <8, 8, 9, 10, or 11 mol % $Al_2O_3$.

The glass compositions in the embodiments described herein further comprise $B_2O_3$. Like $SiO_2$ and $Al_2O_3$, $B_2O_3$ contributes to the formation of the glass network. Conventionally, $B_2O_3$ is added to a glass composition in order to decrease the viscosity of the glass composition. However, in some of the embodiments described herein, $B_2O_3$ may work in conjunction with additions of $K_2O$ and $Al_2O_3$ (when present) to increase the annealing point of the glass composition, increase the liquidus viscosity, and inhibit alkali mobility. In the embodiments described herein, $B_2O_3$ is generally present in the glass compositions in an amount from 0 to about 11 mol %. In some embodiments, the glass comprises $B_2O_3$ in an amount from >0 to about 11 mol %. In some embodiments, the glass comprises $B_2O_3$ in an amount from about 4 to about 11 mol %. In other embodiments, the glass comprises from 0 to about 6.5 mol % $B_2O_3$. In still other embodiments, the glass comprises from about 4 to less than 7 mol % $B_2O_3$. In some embodiments, the glass composition can comprise from 0 to about 11 mol %, 0 to about 10 mol %, 0 to about 8 mol %, 0 to about 6 mol %, 0 to about 5 mol %, 0 to 3 mol %, 0 to about 1 mol %, >0 to about 11 mol %, >0 to about 10 mol %, >0 to about 8 mol %, >0 to about 6 mol %, >0 to about 5 mol %, >0 to 3 mol %, >0 to about 1 mol %, about 1 to about 11 mol %, about 1 to about 10 mol %, about 1 to about 8 mol %, about 1 to about 6 mol %, about 1 to about 5 mol %, about 1 to 3 mol %, about 1 to 2 mol %, about 2 to about 11 mol %, about 2 to about 10 mol %, about 2 to about 8 mol %, about 2 to about 6 mol %, about 2 to about 5 mol %, about 2 to 3 mol %, about 4 to about 11 mol %, about 4 to about 10 mol %, about 4 to about 8 mol %, about 4 to less than 7 mol %, about 3 to about 6 mol %, about 3 to about 5 mol %, about 5 to about 11 mol %, about 5 to about 10 mol %, about 5 to about 8 mol %, about 5 to about 6 mol %, about 6 to about 11 mol %, about 6 to about 10 mol %, about 6 to about 8 mol %, about 8 to about 11 mol %, or about 8 to about 10 mol % $B_2O_3$. In some embodiments, the glass composition can comprise about 0, >0, 1, 2, 3, 4, 5, 6, <7, 7, 8, 9, 10, or 11 mol % $B_2O_3$.

The glass compositions in the embodiments described herein also include alkali oxides. Specifically, the glass compositions described herein include at least $K_2O$. The addition of alkali oxides such as $K_2O$ to the glass compositions increases the average coefficient of thermal expansion of the resultant glass and may also decreases the liquidus temperature of the glass. $K_2O$ is used as the primary alkali oxide constituent as the relatively large ionic radius of $K_2O$ (relative to other alkali oxides such as $Na_2O$ and $Li_2O$) decreases the diffusivity of $K_2O$ in the glass. Low $K_2O$ diffusivity is particularly important when the glass composition is used to form backplanes for displays and the diffusion of $K_2O$ from the glass to thin film transistors deposited on the glass damages the transistors. In embodiments where the glass composition is utilized to form a glass core layer of a laminated glass article, the presence of $K_2O$ in the composition may facilitate ion-exchange strengthening of the cladding layers at the interface between the glass core layer and the glass cladding layers fused to the glass core layer. In the embodiments described herein, the concentration of $K_2O$ in the glass compositions is. In some embodiments, the glass composition can comprise from 1 to about 18 mol % $K_2O$. In some embodiments, the glass composition can comprise from 5 to about 18 mol % $K_2O$. In some embodiments, the glass composition can comprise from >8 to about 14 mol % $K_2O$. In some embodiments, the glass composition can comprise from about 1 to 18 mol %, about 1 to about 15 mol %, about 1 to about 12 mol %, about 1 to about 10 mol %, about 3 to about 18 mol %, about 3 to about 15 mol %, about 3 to about 12 mol %, about 3 to about 10 mol %, about 5 to about 18 mol %, about 5 to about 18 mol %, about 5 to about 15 mol %, about 5 to about 12 mol %, about 5 to about 10 mol %, about 8 to about 18 mol %, about 8 to about 15 mol %, about 8 to about 12 mol %, about 8 to about 10 mol %, >8 to about 18 mol %, >8 to about 15 mol %, >8 to about 14 mol %, >8 to about 10 mol %, about 10 to about 18 mol %, about 10 to about 15 mol %, about 10 to about 12 mol %, about 12 to about 18 mol %, or about 12 to about 15 mol % $K_2O$. In some embodiments, the glass composition can comprise about 1, 2, 3, 4, 5, 6, 7, 8, >8, 9, 10, 11, 12, 13, 14, 15, 16, 17, or 18 mol % $K_2O$.

In some embodiments of the glass compositions described herein, the glass compositions may comprise one or more additional alkali oxides, such as $Na_2O$ or $Li_2O$. In some embodiments where addition alkali oxides are present, the alkali oxide is specifically $Na_2O$. In embodiments where additional alkali oxides are present in the glass composition, the concentration of the additional alkali oxides is from >0 to about 3 mol %. In some other embodiments, the additional alkali oxide is $Na_2O$, which is present in the glass composition at >0 mol % to about 1 mol %. In some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, 0 to about 0.01 mol %, >0 to about 3 mol %, >0 to about 2 mol %, >0 to about 1 mol %, >0 to about 0.5 mol %, >0 to about 0.1 mol %, >0 to about 0.05 mol %, or >0 to about 0.01 mol % $Na_2O$ or $Li_2O$ or a combination thereof In some embodiments of the glass compositions described herein, the glass compositions may comprise total alkali oxides, $R_2O$, wherein $R_2O$ is the sum of $Na_2O$, $Li_2O$ $K_2O$, $Rb_2O$, and $Cs_2O$, of from about 1 to about 18 mol %. In some embodiments, the glass compositions may comprise total alkali oxides, $R_2O$, of from about 1 to about 18 mol %, wherein $Na_2O$<1 mol %, $Li_2O$<1 mol %, and $Rb_2O$=0 mol % and $Cs_2O$=0 mol %.

The glass compositions described herein may further comprise one or more alkaline earth oxides. The alkaline earth oxides improve the melting behavior of the glass composition, lower the melting temperature of the glass composition, and inhibit the diffusion of alkali constituents in the glass composition. In some of the embodiments described herein, the alkali earth oxides include MgO, CaO, SrO, BaO or combinations thereof. In some embodiments, the primary alkaline earth oxide present in the glass composition is MgO. In some embodiments, the primary alkaline earth oxide present in the glass composition is BaO which is utilized to minimize alkali diffusivity. However, in other embodiments, the alkaline earth oxide primarily comprises SrO and/or CaO. In still other embodiments, the glass compositions are substantially free from BaO, such as when the glass composition is a "SuperGreen" or environmentally friendly glass composition As defined herein, R'O comprises the mol % of MgO, CaO, SrO, and BaO in the glass composition. In some embodiments, the glass composition can comprise from about 1 to about 28 mol % R'O. In some embodiments, the glass composition can comprise from about 3 to about 16 mol % R'O. In some embodiments, the glass composition can comprise from about 5 to about 16 mol % R'O or about 3 to about 16 mol % R'O. In other embodiments, the glass composition comprises about 3 to less than 9 mol % R'O. In some embodiments, the glass composition can comprise from about 1 to about 28 mol %, about 1 to about 24 mol %, about 1 to about 20 mol %, about 1 to about 16 mol %, about 1 to about 12 mol %, about 1 to about 8 mol %, about 1 to about 5 mol %, about 3 to about 28 mol %, about 3 to about 24 mol %, about 3 to about 20 mol %, about 3 to about 16 mol %, about 3 to about 12 mol %, about 3 to less than 9 mol %, about 3 to about 8 mol %, about 3 to about 5 mol %, about 5 to about 28 mol %, about 5 to about 24 mol %, about 5 to about 20 mol %, about 5 to about 16 mol %, about 5 to about 12 mol %, about 5 to about 8 mol %, about 8 to about 28 mol %, about 8 to about 24 mol %, about 8 to about 20 mol %, about 8 to about 16 mol %, about 8 to about 12 mol %, about 12 to about 28 mol %, about 12 to about 24 mol %, about 12 to about 20 mol %, about 12 to about 16 mol %, about 16 to about 28 mol %, about 16 to about 24 mol %, about 8 to about 20 mol %, or about 20 to about 28 mol % R'O. In some embodiments, the glass composition can comprise about 1, 2, 3, 4, 5, 6, 7, 8, <9, 9, 10, 11, 12, 13, 14, 15, 16, 17, 18, 19, 20, 21, 22, 23, 24, 25, 26, 27, or 28 mol % R'O.

In some embodiments, MgO can be added to the glass to reduce melting temperature, increase strain point, or adjust CTE when used in combination with other alkaline earth compounds (e.g., CaO, SrO, and BaO). In some embodiments, the glass can comprise about 0 to about 7 mol % MgO. In some embodiments, the glass composition can comprise greater than 0 to about 5 mol % MgO. In some embodiments, the glass composition can comprise greater than 0 to about 5 mol % MgO. In some embodiments, the glass composition can comprise 0 to about 7 mol %, 0 to about 5 mol %, 0 to about 4 mol %, 0 to about 3 mol %, 0 to about 2 mol %, 0 to about 1 mol %, >0 to about 7 mol %, >0 to about 5 mol %, >0 to about 4 mol %, >0 to about 3 mol %, >0 to about 2 mol %, >0 to about 1 mol %, about 1 to about 7 mol %, about 1 to about 5 mol %, about 1 to about 4 mol %, about 1 to about 3 mol %, about 1 to about 2 mol %, about 2 to about 7 mol %, about 2 to about 5 mol %, about 2 to about 4 mol %, about 2 to about 3 mol %, about 3 to about 7 mol %, about 3 to about 5 mol %, about 3 to about 4 mol %, about 4 to about 7 mol %, about 4 to about 5 mol %, or about 5 to about 7 mol % MgO. In some embodiments, the glass compositions can comprise about 0, >0, 1, 2, 3, 4, 5, 6, or 7 mol % MgO.

In some embodiments, CaO can contribute to higher strain point, lower density, and lower melting temperature. More generally, it can be a component of certain possible devitrification phases, particularly anorthite ($CaAl_2Si_2O_8$), and this phase has complete solid solution with an analogous sodium phase, albite ($NaAlSi_3O_8$). CaO sources include limestone, an inexpensive material, so to the extent that volume and low cost are factors, in some embodiments it is can be useful to make the CaO content as high as can be reasonably achieved relative to other alkaline earth oxides. The glasses or glass ceramics embodied herein can comprise 0 to 10 mol % CaO. In some embodiments, the glass or glass ceramic composition can comprise from 0 to about 10 mol % CaO. In some embodiments, the glass composition about from 0 to about 9 mol % CaO. In some embodiments, the glass composition can comprise from >0 to about 9 mol % CaO. In some embodiments, the glass composition can comprise from 0 to about 10 mol %, 0 to about 9 mol %, 0 to about 6 mol %, 0 to about 5 mol %, 0 to 3 mol %, 0 to about 1 mol %, >0 to about 10 mol %, >0 to about 9 mol %, >0 to about 6 mol %, >0 to about 5 mol %, >0 to 3 mol %, >0 to about 1 mol %, 1 to about 10 mol %, about 1 to about 9 mol %, about 1 to about 6 mol %, about 1 to about 5 mol %, about 1 to 3 mol %, about 1 to 2 mol %, about 2 to about 10 mol %, about 2 to about 9 mol %, about 2 to about 6 mol %, about 2 to about 5 mol %, about 2 to 3 mol %, about 3 to about 10 mol %, about 3 to about 9 mol %, about 3 to about 6 mol %, about 3 to about 5 mol %, about 5 to about 10 mol %, about 5 to about 9 mol %, about 5 to about 6 mol %, about 6 to about 10 mol %, about 6 to about 9 mol %, or about 9 to about 10 mol % CaO. In some embodiments, the glass composition can comprise about 0, >0, 1, 2, 3, 4, 5, 6, 7, 8, 9, or 10 mol % CaO.

In some embodiments, the glass can comprise about 0 to about 5 mol % BaO. In some embodiments, the glass composition can comprise greater than 0 to about 4 mol % BaO. In other embodiments, the glass composition can comprise greater than 0 to about 1 mol % BaO. In some embodiments, the glass or glass composition composition can comprise from 0 to about 5 mol %, 0 to 4 mol %, 0 to 3 mol %, 0 to about 2 mol %, 0 to about 1 mol %, >0 to about 5 mol %, >0 to about 4 mol %, >0 to about 3 mol %, >0 to about 2 mol %, >0 to about 1 mol %, about 1 to about 5 mol %, about 1 to about 4 mol %, about 1 to about 3 mol %, about 1 to about 2 mol %, about 2 to about 5 mol %, about 2 to about 4 mol %, about 2 to about 3 mol %, about 3 to about 5 mol %, about 3 to about 4 mol %, or about 4 to about 5 mol % BaO. In some embodiments, the glass composition can comprise about 0, >0, 1, 2, 3, 4, or 5 mol % BaO.

SrO can contribute to higher coefficient of thermal expansion, and the relative proportion of SrO and SrO can be manipulated to improve liquidus temperature, and thus liquidus viscosity. In some embodiments, the glass can comprise about 1 to about 8 mol % SrO. In some embodiments, the glass composition can comprise about 2 to about 6 mol % SrO. In some embodiments, the glass composition can comprise about 1 to about 8 mol %, about 1 to about 6 mol %, about 1 to about 4 mol %, about 1 to about 2 mol %, about 2 to about 8 mol %, about 2 to about 6 mol %, about 2 to about 4 mol %, about 4 to about 8 mol %, about 4 to about 6 mol %, or about 6 to about 8 mol % SrO. In some embodiments, the glass compositions can comprise about 1, 2, 3, 4, 5, 6, 7, or 8 mol % SrO.

Concentrations of $ZrO_2$ may optionally be found in the glass as a function of the forming process or added as an additional component. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, 0 to 0.01 mol %, >0 to about 3 mol %, >0 to about 2 mol %, >0 to about 1 mol %, >0 to 0.5 mol %, >0 to 0.1 mol %, >0 to 0.05 mol %, >0 to 0.01 mol % $ZrO_2$.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

In some embodiments, the glass or glass ceramic further includes a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 mol %. In some embodiments, the fining agent amount is from >0 to about 3 mol %. Chemical fining agents may also include $CeO_2$, $Fe_2O_3$, and other oxides of transition metals, such as $MnO_2$. These oxides may introduce color to the glass or glass ceramic via visible absorptions in their final valence state(s) in the glass, and thus, when present, their concentration is usually kept at a level of 0.5, 0.4, 0.3, 0.2, 0.1 or >0 mol %.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, and forming attributes. The glass can comprise from 0 to about 3 mol %, 0 to about 2 mol %, 0 to about 1 mol %, 0 to 0.5 mol %, or 0 to 0.1 mol % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise zero weight percent of $Sb_2O_3$ or $As_2O_3$ or a combination thereof, or the glass may be, for example, free of any intentionally added $Sb_2O_3$, $As_2O_3$, or combinations thereof Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 mol % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, halogens, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $CeO_2$, $Fe_2O_3$, halogens, or combinations thereof The glass compositions described herein generally have a coefficient of thermal expansion (CTE) which is greater than or equal to about $55 \times 10^{-7}$/° C. averaged over the range from 20° C. to 300° C. In some embodiments, the CTE of the glass compositions may be from about $55 \times 10^{-7}$/° C. to about $120 \times 10^{-7}$/° C. in a range from 20° C. to 300° C. In other embodiments, the CTE of the glass compositions may be from about $75 \times 10^{-7}$/° C. to about $110 \times 10^{-7}$/° C. in a range from 20° C. to 300° C. In yet other embodiments, the CTE of the glass compositions may be from about $90 \times 10^{-7}$/° C. to about $110 \times 10^{-7}$/° C. in a range from 20° C. to 300° C. These relatively high CTEs make the glass compositions particularly well suited for use as a glass core layer in a fusion-formed laminated glass article. Specifically, when the high CTE of the glass core layer is paired with glass cladding layers having lower CTEs during the fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article without the need for an ion exchange treatment or thermal tempering.

The glass compositions described herein have a liquidus viscosity which renders them suitable for use in a fusion draw process and, in particular, for use as a glass core composition in a fusion laminate process. In some embodiments, the liquidus viscosity is greater than or equal to about 100 kPoise. In some other embodiments, the liquidus viscosity may be greater than or equal to 350 kPoise or even greater than or equal to 500 kPoise. The high liquidus viscosity values of the glass compositions described herein are attributable to the combination of a low liquidus temperature with a highly polymerized melt containing high $SiO_2$ content.

The glass compositions described herein have a low liquidus temperature which, like the liquidus viscosity, renders the glass compositions suitable for use in a fusion draw process and, in particular, for use as a glass core layer in a fusion laminate process. A low liquidus temperature prevents devitrification of the glass during the fusion draw fusion. This ensures high-quality homogeneous glass and consistent flow behavior. In some embodiments, the glass compositions have a liquidus temperature from about 900° C. to about 1300° C. In some other embodiments, the liquidus temperature may be less than or equal to about 1000° C. or even less than or equal to about 950° C. In some embodiments, the liquidus temperature of the glass compositions may be less than or equal to 900° C. The liquidus temperature of the glass composition generally decreases with increasing concentrations of $B_2O_3$, alkali oxides and/or alkaline earth oxides.

Table 1 provides embodied example compositional ranges, as discussed herein, that may also provide the attributes, properties or desired traits disclosed herein. Unless zero ("0") or preceded by a less than or greater than (">" or "<") sign, all numerical values in the table should be considered to refer to "about" said value.

TABLE 1

| Composition (mol %) | A | B | C | D | E | F | G |
|---|---|---|---|---|---|---|---|
| $SiO_2$ | 60-75 | 61-75 | 60-73 | 61-73 | 64-71 | 60-75 | 60-75 |
| $Al_2O_3$ | 2-11 | 2-11 | 2-11 | 2-11 | 2-11 | 5-11 | 2-8 |
| $B_2O_3$ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-4 | 0-4 | 0-4 | 0-4 | 0-4 | 0-4 | 0-4 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | H | I | J | K | L | M | N |
|---|---|---|---|---|---|---|---|
| $SiO_2$ | 60-75 | 60-75 | 60-75 | 60-75 | 60-75 | 60-75 | 60-75 |
| $Al_2O_3$ | 5-8 | 2-11 | 2-11 | 2-11 | 2-11 | 2-11 | 2-11 |
| $B_2O_3$ | 0-11 | 4-11 | 0-8 | 4-8 | 0-11 | 0-11 | 0-11 |
| MgO | 0-7 | 0-7 | 0-7 | 0-7 | 2-7 | 0-4 | 2-4 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-4 | 0-4 | 0-4 | 0-4 | 0-4 | 0-4 | 0-4 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | O | P | Q | R | S | T | U |
|---|---|---|---|---|---|---|---|
| $SiO_2$ | 60-75 | 60-75 | 60-75 | 60-75 | 60-75 | 60-75 | 60-75 |
| $Al_2O_3$ | 2-11 | 2-11 | 2-11 | 2-11 | 2-11 | 2-11 | 2-11 |
| $B_2O_3$ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | >0-9 | 0-6 | >0-6 | 0-9 | 0-9 | 0-9 | 0-9 |
| SrO | 1-8 | 1-8 | 1-8 | 2-8 | 1-6 | 2-6 | 1-8 |
| BaO | 0-4 | 0-4 | 0-4 | 0-4 | 0-4 | 0-4 | >0-4 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | V | W | X | Y | Z | AA | AB |
|---|---|---|---|---|---|---|---|
| $SiO_2$ | 60-75 | 60-75 | 60-75 | 60-75 | 60-75 | 60-75 | 60-75 |
| $Al_2O_3$ | 2-11 | 2-11 | 2-11 | 2-11 | 2-11 | 2-11 | 2-11 |
| $B_2O_3$ | 0-11 | 0-11 | 0-11 | 0-11 | 0-11 | 0-11 | 0-11 |
| MgO | 0-7 | 0-7 | 0-7 | 0-7 | 0-7 | 0-7 | 0-7 |
| CaO | 0-9 | 0-9 | 0-9 | 0-9 | 0-9 | 0-9 | 0-9 |
| SrO | 1-8 | 1-8 | 1-8 | 1-8 | 1-8 | 1-8 | 1-8 |
| BaO | 0-3 | >0-3 | 0-4 | 0-4 | 0-4 | 0-4 | 0-4 |
| $K_2O$ | 1-18 | 1-18 | 3-18 | 1-13 | 3-13 | 1-18 | 1-18 |
| $Na_2O$ | 0-1 | 0-1 | 0-1 | 0-1 | 0-1 | >0-1 | 0-0.5 |

| Composition (mol %) | AC | AD | AE | AF | AG | AH | AI |
|---|---|---|---|---|---|---|---|
| $SiO_2$ | 60-75 | 61-73 | 61-73 | 61-73 | 61-73 | 61-73 | 61-73 |
| $Al_2O_3$ | 2-11 | 5-8 | 2-11 | 2-11 | 2-11 | 2-11 | 2-11 |
| $B_2O_3$ | 0-11 | 0-11 | 4-8 | 0-11 | 0-11 | 0-11 | 0-11 |
| MgO | 0-7 | 0-7 | 0-7 | 2-4 | 0-7 | 0-7 | 0-7 |
| CaO | 0-9 | 0-9 | 0-9 | 0-9 | >0-6 | 0-9 | 0-9 |
| SrO | 1-8 | 1-8 | 1-8 | 1-8 | 1-8 | 2-6 | 1-8 |
| BaO | 0-3 | 0-4 | 0-4 | 0-4 | 0-4 | 0-4 | >0-3 |
| $K_2O$ | 1-18 | 1-18 | 1-18 | 1-18 | 1-18 | 1-18 | 1-18 |
| $Na_2O$ | >0-0.5 | 0-1 | 0-1 | 0-1 | 0-1 | 0-1 | 0-1 |

| Composition (mol %) | AJ | AK | AL | AM | AN | AO | AP |
|---|---|---|---|---|---|---|---|
| $SiO_2$ | 61-73 | 60-75 | 60-75 | 60-75 | 60-75 | 60-75 | 60-75 |
| $Al_2O_3$ | 2-11 | 5-8 | 5-8 | 5-8 | 5-8 | 5-8 | 5-8 |
| $B_2O_3$ | 0-11 | 4-8 | 0-11 | 0-11 | 0-11 | 0-11 | 0-11 |
| MgO | 0-7 | 0-7 | 2-4 | 0-7 | 0-7 | 0-7 | 0-7 |
| CaO | 0-9 | 0-9 | 0-9 | >0-6 | 0-9 | 0-9 | 0-9 |
| SrO | 1-8 | 1-8 | 1-8 | 1-8 | 2-6 | 1-8 | 1-8 |
| BaO | 0-4 | 0-4 | 0-4 | 0-4 | 0-4 | >0-3 | 0-4 |
| $K_2O$ | 3-13 | 1-18 | 1-18 | 1-18 | 1-18 | 1-18 | 3-13 |
| $Na_2O$ | 0-1 | 0-1 | 0-1 | 0-1 | 0-1 | 0-1 | 0-1 |

| Composition (mol %) | AQ | AR | AS | AT | AU | AV | AW |
|---|---|---|---|---|---|---|---|
| $SiO_2$ | 60-75 | 60-75 | 60-75 | 60-75 | 60-75 | 60-75 | 60-75 |
| $Al_2O_3$ | 2-11 | 5-8 | 5-8 | 5-8 | 5-8 | 5-8 | 5-8 |
| $B_2O_3$ | 4-8 | 4-8 | 4-8 | 4-8 | 4-8 | 0-11 | 4-8 |
| MgO | 2-4 | 0-7 | 0-7 | 0-7 | 0-7 | 2-4 | 2-4 |
| CaO | 0-9 | >0-6 | 0-9 | 0-9 | 0-9 | >0-6 | 0-9 |
| SrO | 1-8 | 1-8 | 2-6 | 1-8 | 2-6 | 1-8 | 2-6 |
| BaO | 0-4 | 0-4 | >0-3 | 0-4 | 0-4 | 0-4 | 0-4 |
| $K_2O$ | 3-13 | 1-18 | 1-18 | 1-18 | 3-13 | 1-18 | 3-13 |
| $Na_2O$ | 0-1 | 0-1 | 0-1 | 0-1 | 0-1 | 0-1 | 0-1 |

| Composition (mol %) | AX | AY | AZ | BA | BB | BC | BD |
|---|---|---|---|---|---|---|---|
| $SiO_2$ | 60-75 | 60-75 | 60-75 | 60-75 | 60-75 | 60-75 | 60-75 |
| $Al_2O_3$ | 2-11 | 2-11 | 2-11 | 2-11 | 2-11 | 2-11 | 2-11 |
| $B_2O_3$ | 0-11 | 0-11 | 0-11 | 0-11 | 0-11 | 0-11 | 0-11 |
| MgO | 2-4 | 2-4 | 0-7 | 0-7 | 0-7 | 0-7 | 0-7 |
| CaO | 0-9 | 0-9 | >0-6 | >0-6 | >0-6 | 0-9 | 0-9 |
| SrO | 2-6 | 1-8 | 2-6 | 1-8 | 1-8 | 2-6 | 2-6 |
| BaO | >0-3 | 0-4 | 0-4 | >0-3 | 0-4 | >0-3 | 0-4 |

TABLE 1-continued

| | | | | | | | |
|---|---|---|---|---|---|---|---|
| $K_2O$ | 1-18 | 3-13 | 1-18 | 1-18 | 3-13 | 1-18 | 3-13 |
| $Na_2O$ | 0-1 | 0-1 | 0-1 | 0-1 | 0-1 | 0-1 | 0-1 |

| Composition (mol %) | BE | BF | BG | BH | BI | BJ | BK |
|---|---|---|---|---|---|---|---|
| $SiO_2$ | 61-73 | 61-73 | 61-73 | 61-73 | 61-73 | 61-73 | 61-73 |
| $Al_2O_3$ | 5-8 | 5-8 | 5-8 | 5-8 | 5-8 | 5-8 | 5-8 |
| $B_2O_3$ | 4-8 | 4-8 | 4-8 | 4-8 | 4-8 | 4-8 | 4-8 |
| MgO | 2-4 | 0-7 | 0-7 | 0-7 | 0-7 | 2-4 | 2-4 |
| CaO | 0-9 | >0-6 | 0-9 | 0-9 | 0-9 | >0-6 | 0-9 |
| SrO | 1-8 | 1-8 | 2-6 | 1-8 | 1-8 | 1-8 | 2-6 |
| BaO | 0-4 | 0-4 | 0-4 | >0-3 | 0-4 | 0-4 | 0-4 |
| $K_2O$ | 1-18 | 1-18 | 1-18 | 1-18 | 3-13 | 1-18 | 1-18 |
| $Na_2O$ | 0-1 | 0-1 | 0-1 | 0-1 | 0-1 | 0-1 | 0-1 |

| Composition (mol %) | BL | BM | BN | BO | BP | BQ | BR |
|---|---|---|---|---|---|---|---|
| $SiO_2$ | 61-73 | 61-73 | 61-73 | 61-73 | 61-73 | 61-73 | 61-73 |
| $Al_2O_3$ | 5-8 | 5-8 | 5-8 | 5-8 | 5-8 | 5-8 | 5-8 |
| $B_2O_3$ | 4-8 | 4-8 | 4-8 | 4-8 | 4-8 | 4-8 | 4-8 |
| MgO | 2-4 | 2-4 | 2-4 | 2-4 | 2-4 | 2-4 | 2-4 |
| CaO | 0-9 | 0-9 | >0-6 | >0-6 | >0-6 | >0-6 | >0-6 |
| SrO | 1-8 | 1-8 | 2-6 | 1-8 | 1-8 | 2-6 | 2-6 |
| BaO | >0-3 | 0-4 | 0-4 | >0-3 | 0-4 | >0-3 | 0-4 |
| $K_2O$ | 1-18 | 3-13 | 1-18 | 1-18 | 3-13 | 1-18 | 3-13 |
| $Na_2O$ | 0-1 | 0-1 | 0-1 | 0-1 | 0-1 | 0-1 | 0-1 |

| Composition (mol %) | BS | BT | BU | BV | BW | BX | BY |
|---|---|---|---|---|---|---|---|
| $SiO_2$ | 61-73 | 61-75 | 60-73 | 61-75 | 60-73 | 60-73 | 61-75 |
| $Al_2O_3$ | 5-8 | 4-11 | 2-8 | 2-11 | 2-11 | 2-11 | 2-11 |
| $B_2O_3$ | 4-8 | 4-11 | 0-8 | 2-11 | 0-8 | 0-8 | 2-11 |
| MgO | 2-4 | 0-7 | 0-4 | 0-7 | 0-4 | 0-4 | 0-7 |
| CaO | >0-6 | >0-9 | 0-6 | >0-9 | >0-6 | 0-6 | 0-9 |
| SrO | 2-6 | 2-8 | 1-6 | 2-8 | 1-8 | 1-8 | 2-8 |
| BaO | >0-3 | >0-4 | 0-3 | 0-4 | 0-3 | >0-3 | >0-4 |
| $K_2O$ | 3-13 | 3-18 | 1-13 | 3-18 | 1-18 | 1-18 | 3-18 |
| $Na_2O$ | 0-1 | 0-1 | 0-1 | 0-1 | 0-1 | 0-1 | 0-1 |

| Composition (mol %) | BZ | CA | CB | CC | CD | CE | CF |
|---|---|---|---|---|---|---|---|
| $SiO_2$ | 60-75 | 61-75 | 60-73 | 61-73 | 64-71 | 60-75 | 60-75 |
| $Al_2O_3$ | 2-11 | 2-11 | 2-11 | 2-11 | 2-11 | 5-<8 | 2-8 |
| $B_2O_3$ | 4-11 | 4-11 | 4-11 | 4-11 | 4-11 | 4-11 | 4-<7 |
| R'O | 3-16 | 3-16 | 3-16 | 3-16 | 3-16 | 3-16 | 3-16 |
| $K_2O$ | 1-18 | 1-18 | 1-18 | 1-18 | 1-18 | 1-18 | 1-18 |
| $Na_2O$ | 0-1 | 0-1 | 0-1 | 0-1 | 0-1 | 0-1 | 0-1 |

| Composition (mol %) | BZ | CA | CB | CC | CD | CE | CF |
|---|---|---|---|---|---|---|---|
| $SiO_2$ | 60-75 | 60-75 | 61-73 | 61-73 | 61-73 | 61-73 | 61-73 |
| $Al_2O_3$ | 2-11 | 2-11 | 5-<8 | 2-11 | 2-11 | 5-11 | 5-<8 |
| $B_2O_3$ | 4-11 | 4-11 | 4-11 | 4-<7 | 4-11 | 4-11 | 4-<7 |
| R'O | 3-<9 | 3-16 | 3-16 | 3-16 | 3-<9 | 3-16 | 3-16 |
| $K_2O$ | 1-18 | >8-14 | 1-18 | 1-18 | 1-18 | >8-14 | 1-18 |
| $Na_2O$ | 0-1 | 0-1 | 0-1 | 0-1 | 0-1 | 0-1 | 0-1 |

| Composition (mol %) | CG | CH | CI | CJ | CK | CL | CM |
|---|---|---|---|---|---|---|---|
| $SiO_2$ | 61-73 | 61-73 | 61-73 | 61-73 | 61-73 | 62-71 | 62-71 |
| $Al_2O_3$ | 5-<8 | 5-<8 | 5-<8 | 5-<8 | 5-<8 | 5-<8 | 2-11 |
| $B_2O_3$ | 4-11 | 4-11 | 4-<7 | 4-<7 | 4-<7 | 4-<7 | 4-11 |
| R'O | 3-<9 | 3-16 | 3-<9 | 3-16 | 3-<9 | 3-<9 | 3-16 |
| $K_2O$ | 1-18 | >8-14 | 1-18 | >8-14 | >8-14 | 1-18 | 1-18 |
| $Na_2O$ | 0-1 | 0-1 | 0-1 | 0-1 | 0-1 | 0-1 | 0-1 |

Laminates

Referring now to FIG. 1, the glass compositions described herein (Compositions 1-6 and A-CM in Table 1) may be used to form a glass article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass core layer due to their relatively high coefficients of thermal expansion, as will be discussed in more detail herein.

FIG. 1 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass core layer 102 is formed from a first glass composition having an average core coefficient of thermal expansion $CTE_{core}$ and the glass cladding layers 104a, 104b are formed from a second, different glass composition which has an average cladding coefficient of thermal expansion $CTE_{clad}$. The $CTE_{core}$ is greater than $CTE_{clad}$ which results in the glass cladding layers 104a, 104b being compressively stressed without being ion exchanged or thermally tempered.

Figure 2:
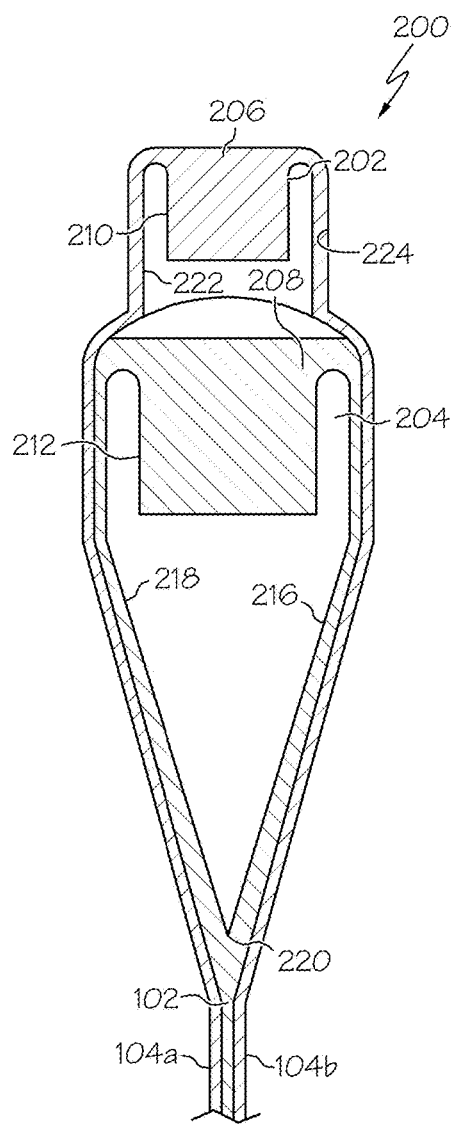
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$ which is greater than the average cladding coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or thermal tempering treatment.

Referring again to the laminated glass article 100 depicted in FIG. 1, the glass core layer 102 of the laminated glass article is formed from a glass composition with a relatively high average coefficient of thermal expansion, such as the glass compositions described herein which have coefficients of thermal expansion greater than or equal to $55 \times 10^{-7}/°$ C. In some embodiments, the CTE of the glass core may be from about $55 \times 10^{-7}/°$ C. to about $120 \times 10^{-7}/°$ C. in a range from 20° C. to 300° C. In other embodiments, the CTE of the glass core may be from about $60 \times 10^{-7}/°$ C. to about $110 \times 10^{-7}/°$ C. in a range from 20° C. to 300° C. In other embodiments, the CTE of the glass core may be from about $75 \times 10^{-7}/°$ C. to about $110 \times 10^{-7}/°$ C. in a range from 20° C. to 300° C. In yet other embodiments, the CTE of the glass core may be from about $90 \times 10^{-7}/°$ C. to about $110 \times 10^{-7}/°$ C. in a range from 20° C. to 300° C.

In one embodiment, the glass core layer is formed from a glass composition having an intermediate to high CTE, such as the glass compositions described in Compositions 1-6, hereinabove, those shown in Table 1, and those shown in the Examples below.

For example, a first glass laminate comprises a core glass composition which comprises from about 60 mol % to about 75 mol % $SiO_2$; from about 2 mol % to about 11 mol % $Al_2O_3$; and from 0 mol % to about 11 mol % $B_2O_3$; from 0 mol % to about 1 mol % $Na_2O$; from about 1 mol % to about 18 mol % $K_2O$; from 0 mol % to about 7 mol % MgO; from 0 mol % to about 9 mol % CaO; from about 1 mol % to about 8 mol % SrO; and from 0 mol % to about 4 mol % BaO. In other embodiments, the glass core may comprise a composition comprising from about 65 mol % to about 75 mol % $SiO_2$; from about 5 mol % to about 11 mol % $Al_2O_3$; from 4 mol % to about 11 mol % $B_2O_3$; from 0 mol % to about 0.5 mol % $Na_2O$; from about 2 mol % to about 13 mol % $K_2O$; from 0 mol % to about 7 mol % MgO; from 0 mol % to about 9 mol % CaO; from about 2 mol % to about 6 mol % SrO; and from 0 mol % to about 1 mol % BaO. The glass compositions may further comprise 0 to about 3 mol %, or in some cases >0 to about 1 mol %, additional components and fining agents, such as $SnO_2$, $Fe_2O_3$, $ZrO_2$.

While specific glass compositions for use as the glass core layer 102 have been described herein, it should be understood that any of the glass compositions described herein may be used to form the glass core layer 102 of the laminated glass article 100.

While the glass core layer 102 of the glass laminate structure has been described hereinabove as being formed from a glass composition having a relatively high average coefficient of thermal expansion, the glass cladding layers 104a, 104b of the glass article 100 are formed from glass compositions which have a lower average coefficient of thermal expansion to facilitate the development of compressive stress in the cladding layers upon cooling of the laminated glass article following fusion formation. For example, the glass cladding layers may be formed from a glass composition as described in co-pending U.S. Provisional Patent Application No. 61/604,839 entitled "Low CTE Alkali-Free Boroaluminosilcate Glass Compositions and Glass Articles Comprising the Same," U.S. Provisional Patent Application No. 61/866,272, entitled "Alkali-Free Boroaluminosilicate Glasses with High Native Scratch Resistance," and U.S. Provisional Patent Application No. 61/821,426 entitled "Alkali-Free Phosphoboroaluminosilicate Glass," all assigned to Corning Incorporated, and all herein incorporated by reference in their entireties. In some embodiments, the glass clad layers have coefficients of thermal expansion from about 10 to about $45 \times 10^{-7}/°$ C. in a temperature range from 20° C. to 300° C. In other embodiments, the glass clad layers have coefficients of thermal expansion from about 20 to about $40 \times 10^{-7}/°$ C. in a temperature range from 20° C. to 300° C. In still other embodiments, the glass clad has a coefficients of thermal expansion of less than $40 \times 10^{-7}/°$ C. in a temperature range from 20° C. to 300° C.

Alternatively, it may be advantageous in certain circumstances to design the clad and the core such that the CTE difference between the two is equal to or greater than a certain value. Such designs may allow for control of the compressive stress of the composite laminate. In some embodiments, the CTE of the glass core is at least about $20 \times 10^{-7}/°$ C. greater than the glass clad in a range from 20° C. to 300° C. In other embodiments, the CTE of the glass core is at least about $30 \times 10^{-7}/°$ C. greater than the glass clad in a range from 20° C. to 300° C. In still other embodiments, the CTE of the glass core is from about $10 \times 10^{-7}/°$ C. to about $80 \times 10^{-7}/°$ C. greater than the glass clad in a range from 20° C. to 300° C. In other embodiments, the CTE of the glass core is from about $20 \times 10^{-7}/°$ C. to about $60 \times 10^{-7}/°$ C. greater than the glass clad in a range from 20° C. to 300° C.

One example glass clad comprises a glass composition comprising: from about 60 mol % to about 66 mol % $SiO_2$; from about 7 mol % to about 10 mol % $Al_2O_3$; from about 14 mol % to about 18 mol % $B_2O_3$; and from about 9 mol % to about 16 mol % alkaline earth oxide, wherein the alkaline earth oxide comprises at least CaO and the CaO is present in the glass composition in a concentration from about 3 mol % to about 12 mol % and the glass composition is substantially free from alkali metals and compounds containing alkali metals. However, it should be understood that other glass compositions may also be used to form the glass cladding layers 104a, 104b of the laminated glass article 100, so long as the coefficients of thermal expansion of the glass cladding layers 104a, 104b are less than the average coefficient of thermal expansion of the glass core layer 102.

EXAMPLES

The embodiments of the glass compositions described herein will be further clarified by the following examples. The glass properties set forth in the Table 2 were determined in accordance with techniques conventional in the glass art. Thus, $T_{str}$ (° C.) is the strain point which is the temperature when the viscosity is equal to $10^{14.7}$ P as measured by beam bending or fiber elongation. The linear coefficient of thermal expansion (CTE) was done using ASTM E228-85 over the temperature range 25-300° C. is expressed in terms of x $10^{-7}$/° C. The annealing point is expressed in terms of ° C. and was determined from fiber elongation techniques (ASTM C336). The density in terms of grams/cm³ was measured via the Archimedes method (ASTM C693). The melting temperature in terms of ° C. (defined as the temperature at which the glass melt demonstrates a viscosity of 400 poises) was calculated employing a Fulcher equation fit to high temperature viscosity data measured via rotating cylinders viscometry (ASTM C965-81).

$T_N$ (° C.) is the liquidus temperature—the temperature where the first crystal is observed in a standard gradient boat liquidus measurement (ASTM C829-81). Under these conditions, the temperature at which crystals are observed in the internal portion of the sample is taken to represent the liquidus of the glass (for the corresponding test period). Testing may be carried out from 24 hours to longer times (e.g. 72 hours), wherein longer times provide the opportunity to observe slower growing phases. The liquidus viscosity in poises was determined from the liquidus temperature and the coefficients of the Fulcher equation.

A plurality of exemplary glass compositions were prepared according to the batch compositions listed in Table 2 below. Batches of the oxide constituent components were mixed, melted and formed into glass plates. The properties of the glass melt (i.e., liquidus temperature, annealing point, etc.) and the resultant glass article were measured and the results are reported in Table 2. As indicated, Examples 1-20 each exhibit a relatively high coefficient of thermal expansion (greater than or equal to about $60 \times 10^{-7}$/° C.) which makes the glass compositions well suited for use with fusion forming processes and, in particular, for use as glass core layers in fusion-formed laminated glass articles.

TABLE 2

| Example Component (mol %) | 1 | 2 | 3 | 4 | 5 | 6 | 7 | 8 |
|---|---|---|---|---|---|---|---|---|
| $SiO_2$ | 68.92 | 69.95 | 65.20 | 72.97 | 74.97 | 70.97 | 70.97 | 70.97 |
| $Al_2O_3$ | 2.40 | 2.43 | 10.46 | 2.47 | 2.47 | 4.47 | 2.47 | 2.47 |
| $B_2O_3$ | 0.234 | 0.156 | 6.19 | 0.078 | 0.078 | 0.078 | 0.078 | 0.078 |
| MgO | 0.648 | 0.432 | 0 | 0.216 | 0.216 | 0.216 | 2.22 | 4.22 |
| CaO | 8.95 | 5.97 | 7.74 | 2.98 | 2.98 | 2.98 | 2.98 | 2.98 |
| SrO | 3.35 | 4.65 | 4.09 | 5.95 | 5.95 | 5.95 | 5.95 | 5.95 |
| BaO | 0 | 0 | 0 | 0 | 0 | 0 | 0 | 0 |
| $K_2O$ | 14.85 | 15.74 | 6.25 | 14.62 | 12.62 | 14.62 | 14.62 | 12.62 |
| $Na_2O$ | 0.5 | 0.5 | 0 | 0.5 | 0.5 | 0.5 | 0.5 | 0.5 |
| $SnO_2$ | 0.142 | 0.178 | 0.07 | 0.214 | 0.214 | 0.214 | 0.214 | 0.214 |
| Properties | | | | | | | | |
| Anneal point (° C.) | 618 | 605 | 669 | 604 | 620 | 625 | 610 | 629 |
| Strain point (° C.) | 571 | 559 | 623 | 556 | 568 | 575 | 561 | 578 |
| Softening point (° C.) | 802.4 | 794.5 | 893.2 | 799.2 | 821.9 | 828.3 | 807.3 | 833.6 |
| CTE ($\times 10^{-7}$/° C.) | 99.8 | 101.8 | 62.4 | 98.4 | 88.8 | 95 | 98 | 91.7 |
| Density (g/cm³) | 2.566 | 2.573 | 2.515 | 2.566 | 2.551 | 2.567 | 2.576 | 2.753 |
| 24 h air liquidus (° C.) | 1030 | | 1030 | No devit >730° C. | No devit >765° C. | 1000 | 890 | 1000 |
| 24 h internal liquidus (° C.) | 1020 | Blisters 1045° C. | 1020 | No devit >730° C. | No devit >765° C. | 995 | 890 | 1000 |
| 24 h Pt liquidus (° C.) | 1015 | | 1010 | No devit >730° C. | No devit >765° C. | 990 | 885 | 960 |
| Primary Devit Phase | Potash feldspar | | Potash feldspar | | | | Leucite | Potassium disilicate | Potassium disilicate |
| $T_{200\ Poise}$ (° C.) | | | 1601.3 | | 1527.7 | | | |
| $T_{35\ kPoise}$ (° C.) | | | 1177.7 | | 1076.9 | | | |
| Liquidus Viscosity (Poise) | | | 893 k | | $1.17 \times 10^9$ | | | |

| Example Component (mol %) | 9 | 10 | 11 | 12 | 13 | 14 | 15 | 16 |
|---|---|---|---|---|---|---|---|---|
| $SiO_2$ | 72.97 | 71.75 | 73.93 | 71.75 | 73.75 | 73.75 | 71.75 | 71.75 |
| $Al_2O_3$ | 2.47 | 4.18 | 2.09 | 4.18 | 4.18 | 4.18 | 4.18 | 6.18 |
| $B_2O_3$ | 0.078 | 5.64 | 5.45 | 5.64 | 3.64 | 3.64 | 5.64 | 3.64 |
| MgO | 2.22 | 0 | 0 | 2 | 0 | 2 | 2 | 0 |
| CaO | 2.98 | 3.10 | 1.55 | 2.11 | 3.10 | 2.11 | 1.13 | 3.10 |
| SrO | 5.95 | 3.21 | 2.92 | 2.19 | 3.21 | 2.19 | 1.18 | 3.21 |
| BaO | 0 | 1.58 | 2.11 | 1.58 | 1.58 | 1.58 | 3.58 | 1.58 |
| $K_2O$ | 12.62 | 10.45 | 11.85 | 10.45 | 10.45 | 10.45 | 10.45 | 10.45 |
| $Na_2O$ | 0.5 | 0 | 0 | 0 | 0 | 0 | 0 | 0 |
| $SnO_2$ | 0.214 | 0.088 | 0.094 | 0.088 | 0.088 | 0.088 | 0.088 | 0.088 |

TABLE 2-continued

| Properties | | | | | | | | |
|---|---|---|---|---|---|---|---|---|
| Anneal point (° C.) | 622 | 640 | 662 | 636 | 645 | 647 | 635 | 652 |
| Strain point (° C.) | 572 | 596 | 619 | 591 | 598 | 599 | 588 | 605 |
| Softening point (° C.) | 828.4 | 830.9 | 814.7 | 836.7 | 842.6 | 859 | 838 | 864.2 |
| CTE ($\times 10^{-7}$/° C.) | 91.4 | 74.7 | 77.6 | 74.2 | 76.6 | 74.2 | 74.5 | 75.9 |
| Density (g/cm$^3$) | 2.564 | 2.551 | 2.565 | 2.515 | 2.542 | 2.508 | 2.562 | 2.538 |
| 24 h air liquidus (° C.) | 935 | 910 | No devit >875° C. | | | | | 980 |
| 24 h internal liquidus (° C.) | 920 | 895 | No devit >875° C. | No devit >780° C. | No devit >760° C. | No devit >825° C. | No devit >870° C. | 965 |
| 24 h Pt liquidus (° C.) | 910 | 870 | No devit >875° C. | | | | | 960 |
| Primary Devit Phase | Potassium dislicate | unknown | | | | | | Potash feldspar |
| $T_{200\ Poise}$ (° C.) | 1510.9 | | | 1547.7 | 1565.4 | 1611.3 | 1552.4 | 1622.9 |
| $T_{35\ kPoise}$ (° C.) | 1088.6 | | | 1095.3 | 1109.6 | 1135.1 | 1096.4 | 1142.2 |
| Liquidus Viscosity (Poise) | $1.74 \times 10^6$ | | | $2.9 \times 10^8$ | $7.42 \times 10^8$ | $1.15 \times 10^8$ | $9.08 \times 10^6$ | $1.55 \times 10^6$ |

| Example Component (mol %) | 17 | 18 | 19 | 20 | 21 | 22 | 23 | 24 |
|---|---|---|---|---|---|---|---|---|
| SiO$_2$ | 72 | 65.2 | 65.2 | 65.2 | 66.09 | 66.28 | 66.18 | 66.26 |
| Al$_2$O$_3$ | 2.5 | 10.46 | 8.46 | 9.46 | 10.00 | 9.95 | 9.78 | 9.77 |
| B$_2$O$_3$ | 0 | 6.19 | 6.19 | 6.19 | 6.64 | 6.50 | 6.75 | 6.70 |
| MgO | 0 | 2 | 2 | 2 | 2.45 | 2.20 | 2.16 | 2.10 |
| CaO | 0 | 6.431 | 7.74 | 7.086 | 6.20 | 6.22 | 6.23 | 6.22 |
| SrO | 7.25 | 3.399 | 4.09 | 3.744 | 3.29 | 3.29 | 3.30 | 3.29 |
| BaO | 0 | 0 | 0 | 0 | 0.04 | 0.04 | 0.04 | 0.04 |
| K$_2$O | 18 | 6.25 | 6.25 | 6.25 | 5.11 | 5.33 | 5.38 | 5.44 |
| Na$_2$O | 0 | 0 | 0 | 0 | 0.09 | 0.09 | 0.09 | 0.09 |
| SnO$_2$ | 0.25 | 0.07 | 0.07 | 0.07 | 0.05 | 0.05 | 0.05 | 0.05 |
| Properties | | | | | | | | |
| Anneal point (° C.) | 597 | 670 | 662 | 668 | 660.2 | 657.8 | 660.5 | 660.1 |
| Strain point (° C.) | 551 | 622 | 619 | 623 | 610.2 | 608.9 | 610.2 | 609.8 |
| Softening point (° C.) | 787 | 904.8 | 885.7 | 893 | 901.4 | 898.4 | 898.1 | 893.2 |
| CTE ($\times 10^{-7}$/° C.) | 109 | 59.9 | 66 | 62.7 | 56.2 | 57.3 | 58 | 58.3 |
| Density (g/cm$^3$) | 2.577 | 2.486 | 2.526 | 2.501 | 2.478 | 2.479 | 2.479 | 2.467 |
| 24 h air liquidus (° C.) | <780 | | | | | | | |
| 24 h internal liquidus (° C.) | <780 | | | | | | | |
| 24 h Pt liquidus (° C.) | <780 | | | | | | | |
| Primary Devit Phase | none | | | | | | | |
| $T_{200\ Poise}$ (° C.) | | 1630 | 1555 | 1596 | 1626.8 | 1640.6 | 1619.4 | 1623.2 |
| $T_{35\ kPoise}$ (° C.) | | 1188 | 1139 | 1175 | 1188.3 | 1191.4 | 1185.3 | 1186.1 |
| Liquidus Viscosity (Poise) | | 356K | | 278k | | | | |

| Example Component (mol %) | 25 | 26 | 27 | 28 | 29 | 30 | 31 | 32 |
|---|---|---|---|---|---|---|---|---|
| SiO$_2$ | 66.28 | 66.33 | 66.64 | 66.56 | 66.47 | 66.72 | 66.69 | 66.34 |
| Al$_2$O$_3$ | 9.78 | 9.51 | 9.57 | 9.49 | 9.51 | 9.77 | 9.91 | 9.90 |
| B$_2$O$_3$ | 6.65 | 6.88 | 6.65 | 6.73 | 6.63 | 6.08 | 5.97 | 6.17 |
| MgO | 2.06 | 2.02 | 1.94 | 1.96 | 1.93 | 1.92 | 1.92 | 1.93 |
| CaO | 6.26 | 6.26 | 6.15 | 6.17 | 6.24 | 6.24 | 6.23 | 6.28 |
| SrO | 3.27 | 3.28 | 3.24 | 3.25 | 3.27 | 3.26 | 3.27 | 3.29 |
| BaO | 0.04 | 0.04 | 0.04 | 0.04 | 0.04 | 0.04 | 0.04 | 0.04 |
| K$_2$O | 5.47 | 5.50 | 5.59 | 5.63 | 5.75 | 5.78 | 5.79 | 5.86 |
| Na$_2$O | 0.09 | 0.09 | 0.09 | 0.09 | 0.09 | 0.10 | 0.09 | 0.09 |
| SnO$_2$ | 0.05 | 0.05 | 0.06 | 0.06 | 0.06 | 0.06 | 0.06 | 0.06 |
| Properties | | | | | | | | |
| Anneal point (° C.) | 660.1 | 658.5 | 658.8 | 660.3 | 657.5 | 658 | 660.6 | 660.4 |
| Strain point (° C.) | 609.4 | 607.8 | 610.1 | 609.4 | 607.7 | 609.1 | 610.5 | 610 |
| Softening point (° C.) | 898.4 | 892.5 | 887.3 | 896.4 | 891.8 | 900.4 | 899.3 | 898.5 |
| CTE ($\times 10^{-7}$/° C.) | 58.2 | 58.2 | 58.2 | 58.7 | 59.5 | 59.3 | 59 | 59.2 |
| Density (g/cm$^3$) | 2.467 | 2.466 | 2.464 | 2.465 | 2.466 | 2.466 | 2.469 | 2.469 |
| Primary Devit Phase | | | | | | | | |
| $T_{200\ Poise}$ (° C.) | 1632.6 | 1621.6 | 1640.7 | 1613.9 | 1637.0 | 1652.4 | 1653.2 | 1639.3 |
| $T_{35\ kPoise}$ (° C.) | 1191.3 | 1184.5 | 1191.3 | 1182.6 | 1190.9 | 1197.0 | 1201.0 | 1194.0 |
| Liquidus Viscosity (Poise) | | | | | | | | |

TABLE 2-continued

| Example Component (mol %) | 33 | 34 | 35 | 36 | 37 | 38 | 39 | 40 |
|---|---|---|---|---|---|---|---|---|
| $SiO_2$ | 66.54 | 66.47 | 65.37 | 64.30 | 63.91 | 63.55 | 63.53 | 63.49 |
| $Al_2O_3$ | 10.03 | 10.00 | 9.84 | 9.67 | 9.57 | 9.55 | 9.59 | 9.55 |
| $B_2O_3$ | 6.00 | 6.10 | 6.47 | 6.86 | 6.94 | 7.22 | 7.15 | 7.13 |
| MgO | 1.90 | 1.89 | 2.12 | 2.32 | 2.40 | 2.44 | 2.46 | 2.46 |
| CaO | 6.23 | 6.21 | 6.64 | 7.05 | 7.26 | 7.32 | 7.31 | 7.39 |
| SrO | 3.28 | 3.26 | 3.51 | 3.76 | 3.86 | 3.89 | 3.92 | 3.95 |
| BaO | 0.04 | 0.04 | 0.04 | 0.04 | 0.04 | 0.04 | 0.04 | 0.04 |
| $K_2O$ | 5.79 | 5.83 | 5.83 | 5.81 | 5.82 | 5.80 | 5.81 | 5.77 |
| $Na_2O$ | 0.09 | 0.09 | 0.09 | 0.09 | 0.09 | 0.10 | 0.09 | 0.10 |
| $SnO_2$ | 0.07 | 0.07 | 0.07 | 0.07 | 0.07 | 0.07 | 0.07 | 0.08 |
| Properties | | | | | | | | |
| Anneal point (° C.) | 661.2 | 663.2 | 658.7 | 658.6 | 657.7 | 655.8 | 658.4 | 654.2 |
| Strain point (° C.) | 611.3 | 612.4 | 610.6 | 608.5 | 608.4 | 607.2 | 608.6 | 605.9 |
| Softening point (° C.) | 904 | 904.3 | 896.1 | 877.6 | 875.3 | 875.1 | 873.8 | 870.4 |
| CTE ($\times 10^{-7}$/° C.) | 58.7 | | 60.2 | 61.2 | 62.5 | 62.4 | 62.7 | 62.2 |
| Density (g/cm$^3$) | 2.47 | 2.469 | 2.482 | 2.496 | 2.501 | 2.503 | 2.504 | 2.505 |
| Primary Devit Phase | Potash Feldspar | | | | | | | |
| $T_{200\ Poise}$ (° C.) | 1650.7 | 1638.3 | 1605.3 | 1562.1 | 1553.7 | 1545.7 | 1537.3 | 1528.9 |
| $T_{35\ kPoise}$ (° C.) | 1198.5 | 1195.7 | 1174.7 | 1156.0 | 1150.7 | 1144.2 | 1143.8 | 1136.6 |
| Liquidus Viscosity (Poise) | 1251 | | | | | | | |

| Example Component (mol %) | 41 | 42 | 43 | 44 | 45 | 46 | 47 | 48 |
|---|---|---|---|---|---|---|---|---|
| $SiO_2$ | 63.54 | 63.46 | 64.07 | 66.23 | 66.52 | 68.18 | 69.50 | 70.83 |
| $Al_2O_3$ | 9.55 | 9.56 | 9.31 | 9.07 | 8.23 | 7.57 | 6.98 | 6.36 |
| $B_2O_3$ | 7.08 | 7.09 | 6.89 | 6.87 | 6.40 | 6.01 | 5.87 | 5.73 |
| MgO | 2.47 | 2.49 | 2.37 | 0.23 | 1.89 | 1.58 | 1.29 | 1.06 |
| CaO | 7.39 | 7.41 | 7.15 | 6.83 | 5.88 | 5.08 | 4.34 | 3.64 |
| SrO | 3.93 | 3.95 | 3.96 | 4.08 | 4.02 | 4.02 | 4.00 | 4.02 |
| BaO | 0.04 | 0.04 | 0.04 | 0.05 | 0.04 | 0.04 | 0.04 | 0.04 |
| $K_2O$ | 5.80 | 5.79 | 5.96 | 6.43 | 6.81 | 7.30 | 7.76 | 8.11 |
| $Na_2O$ | 0.09 | 0.09 | 0.10 | 0.10 | 0.10 | 0.10 | 0.10 | 0.10 |
| $SnO_2$ | 0.07 | 0.07 | 0.09 | 0.08 | 0.08 | 0.08 | 0.08 | 0.08 |
| Properties | | | | | | | | |
| Anneal point (° C.) | 655.2 | 657.2 | 653.6 | 661.6 | 667.3 | 662.7 | 656.6 | 646.4 |
| Strain point (° C.) | 607.5 | 608.5 | 606.5 | 608.2 | 610.5 | 607.4 | 602.6 | 596.8 |
| Softening point (° C.) | 864.1 | 870.5 | 873 | 874.2 | 886 | 888.2 | 870.8 | 862 |
| CTE ($\times 10^{-7}$/° C.) | 62.2 | 62.4 | 62.3 | 64.8 | 66.2 | 67.8 | 69.2 | 68.5 |
| Density (g/cm$^3$) | 2.505 | 2.507 | 2.505 | | 2.489 | 2.48 | 2.477 | 2.476 |
| Primary Devit Phase | | Potash Feldspar | | | | | | |
| $T_{200\ Poise}$ (° C.) | 1540.9 | 1523.4 | 1574.7 | 1551.5 | 1546.4 | 1569.4 | 1570.8 | 1575.7 |
| $T_{35\ kPoise}$ (° C.) | 1140.6 | 1136.1 | 1155.8 | 1153.6 | 1156.0 | 1162.4 | 1160.0 | 1154.4 |
| Liquidus Viscosity (Poise) | | 256 | | | | | | |

| Example Component (mol %) | 49 | 50 | 51 | 52 | 53 | 54 | 55 | 56 |
|---|---|---|---|---|---|---|---|---|
| $SiO_2$ | 71.28 | 71.44 | 71.42 | 71.47 | 71.31 | 71.34 | 71.35 | 71.47 |
| $Al_2O_3$ | 6.21 | 6.16 | 6.12 | 6.11 | 6.09 | 6.05 | 6.05 | 6.03 |
| $B_2O_3$ | 5.56 | 5.38 | 5.46 | 5.46 | 5.69 | 5.73 | 5.56 | 5.41 |
| MgO | 0.99 | 0.97 | 0.96 | 0.94 | 0.96 | 0.94 | 0.91 | 0.78 |
| CaO | 3.47 | 3.43 | 3.41 | 3.39 | 3.37 | 3.32 | 3.21 | 2.79 |
| SrO | 4.01 | 4.04 | 4.03 | 4.03 | 4.03 | 4.02 | 4.12 | 4.26 |
| BaO | 0.04 | 0.04 | 0.04 | 0.04 | 0.04 | 0.04 | 0.05 | 0.05 |
| $K_2O$ | 8.23 | 8.32 | 8.34 | 8.34 | 8.31 | 8.33 | 8.54 | 8.98 |
| $Na_2O$ | 0.10 | 0.10 | 0.10 | 0.10 | 0.10 | 0.10 | 0.09 | 0.10 |
| $SnO_2$ | 0.08 | 0.08 | 0.08 | 0.09 | 0.08 | 0.09 | 0.10 | 0.10 |
| Properties | | | | | | | | |
| Anneal point (° C.) | 638.4 | 640.2 | 638.9 | 637.8 | 639.3 | 638 | 636.8 | 635.6 |
| Strain point (° C.) | 592 | 592.3 | 590.6 | 591.4 | 592 | 589.5 | 589.7 | 587.8 |
| Softening point (° C.) | 860.5 | 857.4 | 854.9 | 857.9 | 853.6 | 858.8 | 856.4 | 854.8 |
| CTE ($\times 10^{-7}$/° C.) | 69.4 | 69.8 | 69.7 | 69.7 | 70 | 70.4 | 70.7 | 71.4 |
| Density (g/cm$^3$) | 2.475 | 2.477 | 2.477 | 2.477 | 2.478 | 2.478 | 2.482 | 2.485 |
| Primary Devit Phase | | | | | | | | |
| $T_{200\ Poise}$ (° C.) | 1594.1 | 1581.1 | 1580.9 | 1590.9 | 1579.2 | 1586.6 | 1586.9 | 1573.7 |
| $T_{35\ kPoise}$ (° C.) | 1156.2 | 1153.1 | 1151.8 | 1154.0 | 1151.3 | 1154.3 | 1151.8 | 1147.1 |
| Liquidus Viscosity (Poise) | | 256 | | | | | | |

TABLE 2-continued

| Example Component (mol %) | 57 | 58 | 59 | 60 | 61 | 62 | 63 | 64 |
|---|---|---|---|---|---|---|---|---|
| $SiO_2$ | 71.53 | 71.90 | 71.95 | 72.33 | 71.98 | 72.10 | 72.09 | 72.42 |
| $Al_2O_3$ | 6.03 | 6.02 | 6.00 | 6.01 | 6.00 | 5.99 | 5.99 | 6.01 |
| $B_2O_3$ | 5.23 | 4.82 | 4.77 | 4.13 | 4.57 | 4.49 | 4.46 | 4.05 |
| MgO | 0.66 | 0.38 | 0.20 | 0.07 | 0.08 | 0.02 | 0.02 | 0.00 |
| CaO | 2.36 | 1.48 | 0.85 | 0.39 | 0.42 | 0.21 | 0.20 | 0.16 |
| SrO | 4.43 | 4.70 | 4.87 | 5.08 | 5.06 | 5.11 | 5.13 | 5.16 |
| BaO | 0.05 | 0.05 | 0.05 | 0.06 | 0.06 | 0.06 | 0.06 | 0.06 |
| $K_2O$ | 9.47 | 10.42 | 11.07 | 11.66 | 11.57 | 11.77 | 11.80 | 11.87 |
| $Na_2O$ | 0.11 | 0.11 | 0.11 | 0.11 | 0.11 | 0.11 | 0.11 | 0.11 |
| $SnO_2$ | 0.10 | 0.10 | 0.10 | 0.11 | 0.11 | 0.11 | 0.11 | 0.12 |
| Properties | | | | | | | | |
| Anneal point (° C.) | 633.9 | 628.5 | 627.7 | 625.7 | 623.6 | 624.4 | 623.5 | 621.6 |
| Strain point (° C.) | 586.4 | 582.3 | 580.7 | 579 | 577.4 | 577.1 | 576.3 | 575.1 |
| Softening point (° C.) | 847.6 | 844 | 836.1 | 834.7 | 840 | 830.6 | 831.2 | 833.9 |
| CTE ($\times 10^{-7}$/° C.) | 73.3 | 76.5 | 78.1 | 80.2 | 78.8 | 80.2 | 80.5 | 80.2 |
| Density (g/cm$^3$) | 2.492 | 2.5 | 2.504 | 2.51 | 2.511 | 2.511 | 2.512 | 2.513 |
| Primary Devit Phase | | | | | | | | Unknown Feldspar |
| $T_{200\ Poise}$ (° C.) | 1573.5 | 1546.1 | 1544.9 | 1545.3 | 1550.1 | 1530.4 | 1544.4 | 1537.1 |
| $T_{35\ kPoise}$ (° C.) | 1145.2 | 1127.4 | 1128.0 | 1126.6 | 1126.5 | 1119.1 | 1124.8 | 1118.9 |
| Liquidus Viscosity (Poise) | | | | | | | | 544 |

Because the glass compositions described herein have a relatively high average coefficient of thermal expansion, they are particularly well suited for use in conjunction with glass compositions having relatively lower coefficients of thermal expansion to form compressively stressed laminated glass articles by the fusion laminate process. These glass articles may be employed in a variety of consumer electronic devices including, without limitation, mobile telephones, personal music players, tablet computers, LCD and LED displays, automated teller machines and the like. Further, the properties of the glass compositions described herein (e.g., the liquidus viscosity, the liquidus temperature, and the like) make the glass compositions well suited for use with fusion forming processes, such as the fusion down draw process or the fusion lamination process. Additionally, the mobility of alkali ions in the glass compositions is significantly reduced due to the low concentration of $Al_2O_3$ as well as the higher concentration of $B_2O_3$ in the glass compositions, making the compositions particularly well suited for use as backplane substrates of LCD, LED and OLED displays where the presence of highly mobile alkali ions in the backplane substrate may damage the thin film transistors on the substrate. Finally, while specific reference has been made herein to the use of the glass compositions as glass core layers in a laminated glass article, it should be understood that the glass compositions may also be used independently (i.e., not as part of a laminated structure) to form glass articles such as cover glasses for electronic devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   about 60 mol % to about 75 mol % $SiO_2$,
   8 mol % to 11 mol % $Al_2O_3$,
   8 mol % to 10 mol % $B_2O_3$,
   0 mol % to about 1 mol % $Na_2O$,
   about 1 mol % to about 18 mol % $K_2O$,
   0 mol % to about 7 mol % MgO,
   0 mol % to about 9 mol % CaO,
   about 1 mol % to about 8 mol % SrO,
   0 mol % to about 4 mol % BaO, and
   about 3 mol % to about 16 mol % R'O, wherein R'O comprises the mol % of MgO, CaO, SrO, and BaO in the composition.

2. The glass composition of claim 1, wherein the composition comprises:
   about 65 mol % to about 75 mol % $SiO_2$,
   8 mol % to 11 mol % $Al_2O_3$,
   8 mol % to 10 mol % $B_2O_3$,
   0 mol % to about 0.5 mol % $Na_2O$,
   about 2 mol % to about 13 mol % $K_2O$,
   0 mol % to about 7 mol % MgO,
   0 mol % to about 9 mol % CaO,
   about 2 mol % to about 6 mol % SrO,
   0 mol % to about 1 mol % BaO, and
   about 3 mol % to about 16 mol % R'O, wherein R'O comprises the mol % of MgO, CaO, SrO, and BaO in the composition.

3. The glass composition of claim 2, wherein the composition comprises:
   about 65 mol % to about 73 mol % $SiO_2$,
   8 mol % to 11 mol % $Al_2O_3$,
   8 mol % to 10 mol % $B_2O_3$,
   >0 mol % to about 0.5 mol % $Na_2O$,
   about 2 mol % to about 13 mol % $K_2O$,
   0 mol % to about 7 mol % MgO,
   >0 mol % to about 9 mol % CaO,
   about 2 mol % to about 6 mol % SrO,
   >0 mol % to about 1 mol % BaO, and
   about 5 mol % to about 16 mol % R'O, wherein R'O comprises the mol % of MgO, CaO, SrO, and BaO in the composition.

4. The glass composition of claim 1, wherein the composition comprises:
   about 60 mol % to about 75 mol % $SiO_2$,
   8 mol % to 11 mol % $Al_2O_3$,
   8 mol % to 10 mol % $B_2O_3$, 0 mol % to about 1 mol % Na$_2$O,
greater than 8 mol % to about 14 mol % K$_2$O,
0 mol % to about 7 mol % MgO,
0 mol % to about 9 mol % CaO,
about 1 mol % to about 8 mol % SrO,
0 mol % to about 4 mol % BaO, and
about 3 mol % to about 16 mol % R'O,
wherein R'O comprises the mol % of MgO, CaO, SrO, and BaO in the composition.

5. The glass composition of claim 1, wherein the composition comprises:
about 60 mol % to about 75 mol % SiO$_2$,
8 mol % to 11 mol % Al$_2$O$_3$,
8 mol % to 10 mol % B$_2$O$_3$,
0 mol % to about 1 mol % Na$_2$O,
about 1 mol % to about 18 mol % K$_2$O,
0 mol % to about 7 mol % MgO,
0 mol % to about 9 mol % CaO,
about 1 mol % to about 8 mol % SrO,
0 mol % to about 4 mol % BaO, and
about 3 mol % to about less than 9 mol % R'O,
wherein R'O comprises the mol % of MgO, CaO, SrO, and BaO in the composition.

6. The glass composition of claim 1, further comprising one or more of SnO$_2$, Fe$_2$O$_3$, or ZrO$_2$, wherein when present, the amount of each of SnO$_2$, Fe$_2$O$_3$, or ZrO$_2$ is from greater than 0 to about 3 mol %.

7. The glass composition of claim 1, consisting essentially of:
about 62 mol % to about 73 mol % SiO$_2$,
8 mol % to 11 mol % Al$_2$O$_3$,
8 mol % to 10 mol % B$_2$O$_3$,
>0 mol % to about 0.5 mol % Na$_2$O,
about 2 mol % to about 13 mol % K$_2$O,
0 mol % to about 7 mol % MgO,
>0 mol % to about 9 mol % CaO,
about 2 mol % to about 6 mol % SrO,
>0 mol % to about 1 mol % BaO,
about 3 mol % to about 16 mol % R'O, wherein R'O comprises the mol % of MgO, CaO, SrO, and BaO in the composition,
wherein the amount of each of SnO$_2$, Fe$_2$O$_3$, or ZrO$_2$ is from greater than 0 to about 3 mol %, and
from 0 to about 3 mol % of TiO$_2$, MnO, ZnO, Nb$_2$O$_5$, MoO$_3$, Ta$_2$O$_5$, WO$_3$, Y$_2$O$_3$, La$_2$O$_3$, HfO$_2$, CdO, CeO$_2$, F$^-$, Cl$^-$, Br$^-$, I$^-$, or combinations thereof.

8. The glass composition of claim 1, wherein the CTE is from about 55×10$^{-7}$/° C. to about 120×10$^{-7}$/° C. in a range from 20° C. to 300° C.

9. The glass composition of claim 1, wherein the liquidus viscosity is greater than or equal to about 100 kPoise.

10. The glass composition of claim 9, wherein the liquidus viscosity is greater than or equal to about 250 kPoise.

11. A glass laminate comprising a glass core and at least one glass clad, wherein the glass core comprises the glass compositions of claim 1.

12. The glass laminate of claim 11, wherein the glass composition comprises one or more of SnO$_2$, Fe$_2$O$_3$, or ZrO$_2$, wherein when present, the amount of each of SnO$_2$, Fe$_2$O$_3$, or ZrO$_2$ is from greater than 0 to about 3 mol %.

13. A device comprising the glass composition or glass laminate of claim 1 as a cover glass or glass backplane in a consumer or commercial electronic device, including LCD and LED displays, computer monitors, automated teller machines (ATMs), for touch screen or touch sensor applications, for portable electronic devices including mobile telephones, personal media players, and tablet computers, for photovoltaic applications, for architectural glass applications, for automotive or vehicular glass applications, or for commercial or household appliance applications.

* * * * *